UNITED STATES PATENT OFFICE.

WILLIAM HOSKINS, OF LA GRANGE, ILLINOIS, ASSIGNOR TO THE PULVERIZED MANURE COMPANY, OF CHICAGO, ILLINOIS, A CORPORATION OF MAINE.

TREATMENT OF MANURE.

970,711.  Specification of Letters Patent.  Patented Sept. 20, 1910.

No Drawing.  Application filed November 5, 1909.  Serial No. 526,338.

*To all whom it may concern:*

Be it known that I, WILLIAM HOSKINS, a citizen of the United States, residing at La Grange, in the county of Cook and State of Illinois, have invented a new and useful Improvement in the Treatment of Manure, of which the following is a specification.

This invention relates to the production of fertilizer in a concentrated condition, from manure formed of the excrementitious product of live stock, particularly when mixed, as is usual, with refuse litter.

Manure, as it usually occurs, consists in large part of refuse litter and undigested excrementitious products, neither of which in themselves contain fertilizer elements in sufficient quantity to render them commercially valuable as soil enrichers; and, so far as I am aware, no attempt has been hitherto made to treat manure for the purpose of concentrating out of it and saving the fertilizer values on a commercial scale.

My object, broadly stated, is to provide a simple and improved method whereby live-stock manure, as accumulated at stock yards, for example, may be treated in large quantities and with economy for the production of concentrated fertilizer in condition for ready handling, shipment and use; and my invention consists in a method of treating the manure to extract and save more especially the digested, albuminous and any other valuable fertilizer elements, and may further consist in cleaning and saving, in the same or further steps of procedure, undigested and litter constituents of the manure as by-products for other uses.

In carrying out my improved method as I prefer to practice it for the treatment of live-stock manure containing refuse litter, as straw, for example, and digested and undigested excrementitious product, the mass is fed into a suitable disintegrating machine where it is subjected to maceration by being broken up and steeped in water.

In this steeping operation I employ, ordinarily, about two tons of water, unheated, to one ton of manure, though the relative amount of water employed may depend largely upon the proportions of litter and undigested matter in the mass. The resultant solution is then subjected to a screening action, preferably by being fed to a suitable revolving screen of, say, one-half inch mesh, whereby the liquid is drained off, carrying with it the fertilizer values to be saved. The remaining mass, consisting mostly of litter from which the fertilizer values have been extracted, may then be washed and employed, as a by-product, for cattle-bedding, for the production of paper-pulp, or other purposes. The liquid drained from the mass and carrying the fertilizer values is then subjected to the action of a chemical which will coagulate the albuminous elements, to render them no longer colloid, and cause them and other, solid, constituents, to settle, whereby the surplus water may be drained off; or, and preferably, the liquid drained from the mass and carrying the fertilizer values, is filtered for the purpose of separating therefrom the coagulum, which may then be further concentrated by evaporation to obtain the fertilizer values in dry, finely divided condition for the purpose of storage, handling and shipment. When the fertilizer values are separated from the liquid by filtration, as stated, the filtrate, which should carry no material values, is discarded.

One desirable way of treating the liquid extract, drained from the mass as above described, is by evaporation of its surplus water to leave the valuable fertilizer contents in a more or less dry and therefore highly concentrated condition.

In the treatment of the liquid extract, as described, any chemical may be employed which will tend to coagulate the albuminous fertilizer constituents of the manure, and the chemical may, for example, be any one of a number of mineral sulfates. Alum may be mentioned as one of the chemicals which may be employed with advantage, though on account of its cheapness and effectiveness I employ, by preference, ferric sulfate obtained in solution by dissolving, say, an iron oxid in sulfuric acid. The amount of chemical which must be employed to coagulate the albuminous values will depend more or less upon the particular character of the manure, though it may be stated, for example, that in the treatment of ordinary stock-yards cattle manure the ferric sulfate used may be approximately 460 pounds to the ton of dry concentrated product.

What I claim as new and desire to secure by Letters Patent is—

1. A method of treating liquid manure extract which consists in subjecting it to the action of a chemical which will coagulate albuminous fertilizer constituents thereof, then separating therefrom and concentrating the coagulated materials.

2. A method of treating manure which consists in subjecting a mass thereof to maceration in an excess of water, then screening the mass to drain therefrom the water and albuminous fertilizer elements, then subjecting the drained liquid to the action of a chemical which will coagulate said albuminous elements, and finally separating from the liquid and concentrating the coagulated material.

3. The method of treating manure, containing the excrementitious product of live stock, which consists in steeping the mass, then draining therefrom the liquid and fertilizer values, and then concentrating to a more or less dry state said values.

4. The method of treating manure which consists in subjecting a mass thereof to maceration, draining from the mass fertilizer elements in solution, then subjecting the solution to the action of a sulfate to render albuminous fertilizer elements no longer colloid, then separating from the solution and saving the fertilizing constituents of the solution.

5. The method of treating manure which consists in subjecting a mass thereof to maceration, draining from the mass fertilizer elements in solution, then subjecting the solution to the action of a sulfate to render albuminous fertilizer elements no longer colloid, then separating from the solution and drying the fertilizing constituents of the solution.

6. As a new article of manufacture, fertilizer consisting of extracted and highly concentrated inherent fertilizer-elements of animal manure in a dry condition.

7. As a new article of manufacture, fertilizer consisting substantially of extracted inherent and highly concentrated fertilizer-elements of animal manure in dry, finely-divided condition.

WILLIAM HOSKINS.

In presence of—
 CHAS. E. GAYLORD,
 RALPH A. SCHAEFER.